United States Patent
Cummings

(10) Patent No.: US 11,736,963 B2
(45) Date of Patent: Aug. 22, 2023

(54) SERVER FARM SOLUTION FOR NETWORK PERFORMANCE TESTING

(71) Applicant: T-Mobile USA, Inc., Bellevue, WA (US)

(72) Inventor: Oscar R. Cummings, Lynwood, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/556,383

(22) Filed: Dec. 20, 2021

(65) Prior Publication Data
US 2023/0199531 A1    Jun. 22, 2023

(51) Int. Cl.
H04W 24/06 (2009.01)
G06F 9/48 (2006.01)
G06F 3/0484 (2022.01)
H04L 41/22 (2022.01)

(52) U.S. Cl.
CPC .......... *H04W 24/06* (2013.01); *G06F 3/0484* (2013.01); *G06F 9/4843* (2013.01); *H04L 41/22* (2013.01)

(58) Field of Classification Search
CPC ...... H04L 41/22; H04W 24/06; G06F 3/0484; G06F 9/4843
See application file for complete search history.

(56) References Cited

U.S. PATENT DOCUMENTS

2015/0339216 A1\* 11/2015 Wade ................ G06F 11/3664
714/38.1
2022/0334860 A1\* 10/2022 Moran ............... G06F 9/45558

\* cited by examiner

*Primary Examiner* — Gerald Johnson
(74) *Attorney, Agent, or Firm* — Lee & Hayes, P.C.

(57) ABSTRACT

A system for testing network performance using a server farm is described. A server in a server farm connected to a management network and a core network may execute virtual machines for multiple users that generate interfaces that the users interact with via the management network connection to configure network performance tests. The virtual machines convert the test configurations into instructions for a testing application and execute the tests using the testing application and the connection to the core network. Test results are provided to the users by the interfaces generated by their respective virtual machines via the management network connection.

16 Claims, 4 Drawing Sheets

SERVER FARM SOLUTION FOR NETWORK PERFORMANCE TESTING

BACKGROUND

Performing meaningful testing of wireless mobile devices and the networks that support them can be challenging. Testing individual connections between devices in such networks (e.g., gateways, routers, switches, etc.) is commonly performed, and is testing a connection between a wireless mobile device and the device to which it directly connects wirelessly (e.g., eNodeB, base transceiver station (BTS), etc.). However, in normal usage, a wireless mobile device may communicate with one or more other devices across multiple networks and network devices using many communication connections of various types. Current techniques for performing thorough testing of end-to-end connectivity and performance for a wireless mobile device require designing and implementing customized systems using highly technical, individualized configurations. These customized systems tend to be fragile and require frequent modification to retain the capability to interoperate with continuously evolving network and mobile devices. Performing consistently reliable and cost-effective large-scale end-to-end testing of wireless mobile devices and the networks that support them remains a challenge for service providers.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
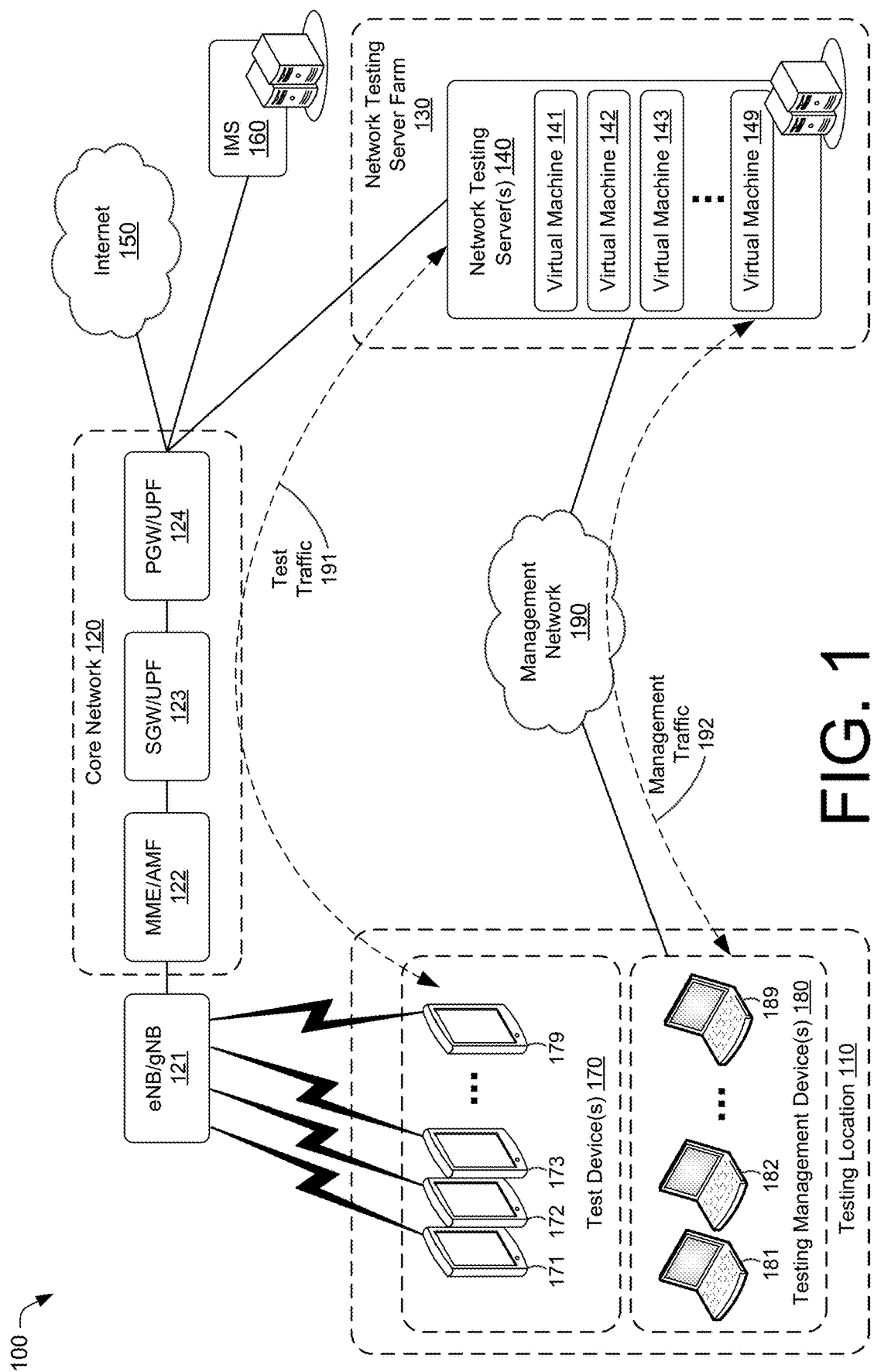
FIG. 1 is a schematic diagram of an illustrative computing environment in which network performance testing using a server farm testing system may be implemented, in accordance with examples of the disclosure.

This disclosure is directed in part to systems and techniques for more efficiently and accurately performing network testing. In conventional systems, direct network connections are routinely tested at the devices implementing those connections. End-to-end connectivity, for example between a wireless mobile device and an application hosted at a remote system, is much more complicated and difficult to test because there are many devices and networks that may be configured between a wireless mobile device and an application. Such end-to-end testing in conventional techniques and systems requires sophisticated equipment and specialized software that must be configured for each test scenario by highly trained users. Thus, performing network testing in conventional systems is time consuming and resource intensive.

In various embodiments, one or more testing servers (e.g., configured as a "server farm") may be configured with one or more virtual machines that may each be configured to execute one or more testing applications. A testing server may be configured to generate and support a user-friendly interface (e.g., a graphical user interface) that allows a user to easily provide testing parameters and configurations to the one or more testing applications. Such a testing server may be configured to execute device and/or network testing based on such parameters and configurations. A testing server configured in a server farm as described herein may be one or more blade servers configured within a blade enclosure. A server farm as described herein may include one or more blade enclosures, each with one or more blade servers configured therein. A server farm may also, or instead, include one or more servers of any other server type.

A server configured in the disclosed testing system may be configured with one or more network communications interfaces. In various embodiments, such a server may have separate and distinct interfaces for each of a management network and a core network. A core network communications interface may be an interface facilitating communicative connectivity between the server and a core network used for user traffic and services (e.g., a network supporting wireless mobile devices and associated service, such as internet connectivity, messaging, telephone calls, etc.). In various examples, this core network communications interface may be a very high bandwidth interface (e.g., 10 Gb, 100 Gb, etc.) that facilitates multiple high bandwidth tests. A management network communications interface may be an interface facilitating communicative connectivity between the server and a management network used for management traffic and communications with management devices (e.g., a network used for network operator access to network devices and/or other devices).

In various embodiments, the disclosed testing system may detect a request for interaction and/or for a testing interface, for example, via a management network interface. The testing system may select a particular server (e.g., server blade) for executing a requested test and/or associated interface(s). The testing system may also, or instead, initiate, select, and/or execute a virtual machine to facilitate the requested test and/or associated interface(s).

Using a virtual machine, the testing system may generate and present (e.g., cause to be presented) a testing user interface, for example, to a user on a display via a management network interface. In examples, a testing user interface may allow a user to select, specify, and/or input various testing configurations and/or parameters. For example, a testing user interface may allow a user to indicate one or more user devices (e.g., each of which may be referred to as a device under test (DUT) and/or a user equipment (UE)), one or more network layer protocols for testing traffic (e.g., IPv4, IPv6, etc.), one or more transport layer protocols for testing traffic (e.g., TCP, UDP, etc.), one or more testing bandwidths, a number of streams of testing traffic, one or more window sizes (e.g., one or more buffer window sizes), one or more ports (e.g., application ports), one or more test durations, one or more test modes, one or more testing applications to be executed for performing a test, and/or any other testing configurations and parameters.

In various embodiments, the testing system may use the testing configurations and/or parameters (e.g., received at a testing user interface) to configure a test. For example, the testing system may convert the relatively user-friendly input provided at a testing user interface into data in a format compatible with a one or more testing applications. In examples, the testing system may convert testing configurations and/or parameters into iPerf (e.g., iPerf, iPerf2, iPerf3) configuration data (e.g., command line instructions). While the instant disclosure makes reference to iPerf as an example testing application, any one or more other testing applications may be configured with and/or used by the disclosed testing system (e.g., in a similar manner as iPerf) and all such configurations and testing applications are contemplated as within the scope of the instant disclosure. For example, the testing system may implement and/or interoperate with one or more voice over LTE (VoLTE) testing applications and/or voice over new radio (VoNR) testing applications. In addition, or instead, the testing system may implement and/or interoperate with one or more testing applications configured to measure and/or generate data related to particular measurements and/or metrics, such as a testing application configured to measure and/or determine one or more mean opinion scores (MOSs) as a measure of Quality of Experience (QoE).

A testing user interface may also, or instead, include one or more testing control elements. For example, a testing user interface may include a control element configured to initiate a test using the configurations and/or parameters configured at the testing user interface in response to user activation of that control element. In examples in which the testing system implements a testing application such as iPerf, the testing system may execute an iPerf testing initiation command and/or other application-specific testing initiation command (e.g., a command line instructions) to initiate a test using the configurations and/or parameters as converted to iPerf or other testing application configuration data. In various embodiments, the testing system may convert the configurations and/or parameters received at the testing user interface to iPerf configuration data and/or other testing application configuration data in response to receiving such input. Alternatively, or in addition, the testing system may convert the configurations and/or parameters received at the testing user interface to iPerf configuration data and/or other testing application configuration data in response to detecting activation of the control element configured to initiate a test.

A testing user interface may also, or instead, include a control element configured to terminate a test in response to user activation of that control element. In examples in which the testing system implements a testing application such as iPerf, the testing system may execute an iPerf testing termination command or other application-specific testing termination command (e.g., a command line instruction) to terminate a test using the configurations and/or parameters as converted to iPerf or other testing application configuration data.

When executing a test, the testing system may generate, transmit, and/or receive testing traffic (e.g., test data traffic) based on the configurations and/or parameters received at the testing user interface using a core network interface.

In various embodiments, a testing user interface may also, or instead, include one or more testing results display elements. For example, a testing user interface may include a display element that displays the results of a test initiated using the configurations and/or parameters configured at the testing user interface. Such results may be displayed at the conclusion of such a test (e.g., upon termination of the test by a user and/or completion of the test based on the test parameters and/or configurations (e.g. test duration)). Alternatively, or in addition, such results may be displayed as the test is ongoing. For example, the display element may display incremental results during the test for portions of the test for which results may be available (e.g., as described in more detail herein).

In various embodiments, the one or more testing results display elements may include a display element that displays a summary of the results of one or more tests. For example, a user may run, on the same virtual machine and/or across multiple virtual machines, more than one test (e.g., using different sets of configurations and/or parameters). The summary of results may include the results of such one or more tests. In various embodiments, the summary of results may reflect the results of tests run using the same virtual machine, for example, previous tests run using the same or different parameters and/or configurations. In such examples, this summary of results may allow a user to easily compare the results of the various tests to one another.

In various embodiments, a testing system may facilitate its use by multiple users, increasing the efficiency of usage of computing and network resources. For example, by making multiple virtual machines available to multiple users, the testing system allows such multiple users to configure and execute tests using a single testing platform (e.g., server farm).

In various embodiments, a testing system may also, or instead, provide one or more administrative user interfaces that allows an administrator to manage the testing system and/or displays management data. For example, the testing system may generate and present an administrative user data interface that provides data associated with the users interacting with the system (e.g., currently and/or historically), such as usernames, usage logs, error logs, and/or any other data associated with usage of the testing system. The testing system may also, or instead, generate and present an administrative system data interface that provides data associated with the testing systems performance and status (e.g., currently and/or historically), such as system component performance history (e.g., CPU utilization, memory utilization, network interface utilization, etc.), system error logs, failures, alarms, availability, etc.

By facilitating the use of various testing applications using a simplified common user interface generated and executed by virtual machines hosted by a server farm, systems and methods described herein can improve the performance and replicability of network testing system and increase the efficient use of device and system resources, while improving the user experience by providing a user-friendly interface to configure and execute sophisticated network tests. The systems and methods described herein may utilize the various algorithmic, expert system, and machine-learned processes described herein in combination with application, system, and testing information to more accurately and efficiently determine the parameters and/or configurations used to implement tests across a network and to more efficiently execute such tests. For example, the methods and systems described herein may be faster and/or more robust than conventional techniques, as they may increase the reliability of the testing systems (e.g., by using a standardized testing platform) and reduce the time and cost associated with configuring and executing tests (e.g., by simplifying the configuration and execution of such tests). That is, the methods and systems described herein provide a technological improvement over existing testing systems and processes by facilitating a current and consistent user experience and the use of common resources to execute multiple tests (e.g., in parallel). In addition to improving the efficiency of network and device testing, the systems and methods described herein can provide more robust systems by, for example, allowing for the use of common devices with sophisticated network testing applications by multiple users have a wide variety of technical expertise.

An illustrative environment and illustrative techniques for implementing a server farm solution for network performance testing are described below. However, the described techniques may be implemented in other environments.

Illustrative System Architecture

FIG. 1 is a schematic diagram of an illustrative computing environment 100 for performing network performance testing. The computing environment 100 may include a testing location 110 that may represent any one or more locations at which a testing user, a testing management device, and/or a test device may be located. For example, users at the testing location 110 may be operating one or more testing management devices 180. There may be any number of testing management devices 180 at the location 110 (e.g., testing management devices 181, 182 . . . 189). The testing management devices 180 may be operated by one or more user to configure and execute network performance tests as described herein. There may also, or instead, be one or more test devices 170 at the location 110 (e.g., test devices 171, 172 . . . 179). The test devices 170 may be associated with one or more network performance tests configured and executed as described herein. When associated with a test, each of the test devices 170 may be referred to as a "device under test" or DUT. Each of the test devices 170 may be a wireless mobile device, a user equipment (UE), a smartphone, a laptop computer, a desktop computer, a tablet computer, and the like.

In various embodiments, the test devices 170 may be wireless mobile devices configured to wirelessly communicate with a network configured to support user wireless communications, such as core network 120. For example, the core network 120 may support user (e.g., customer, subscriber, etc.) access to remote systems, messaging, telephone calls, etc. In various embodiments, the test devices 170 may be configured to communicate with eNodeB/gNodeB 121 (eNB/gNB 121) that may be configured to communicate with and/or otherwise exchange traffic with the core network 120. The eNodeB/gNodeB 121 may communicate with a mobility management entity (MME)/access or mobility management function (AMF) 122 in the core network 120. The MME/AMF 122 may determine a gateway for user traffic received via eNodeB/gNodeB 121 and transmit data to user devices via eNodeB/gNodeB 121. For example, the MME/AMF 122 may communicate with a serving gateway (SGW)/user plane function (UPF) 123 that may be configured to route and forward user data traffic. The SGW/UPF 123 may be configured to communicate with a packet data network gateway (PGW)/UPF 124 that may route and forward packets to a packet network, such as the Internet. For example, the PGW/UPF 124 may transmit and receive data packets to and from the Internet 150. The PGW/UPF 124 may also, or instead, exchange traffic with an IP multimedia subsystem (IMS) 160 that may be configured to provide multimedia services and data to user devices, such as the test devices 170. The PGW/UPF 124 may also, or instead, exchange traffic with a network testing server farm 130 that may be configured to generate, transmit, and/or receive test traffic as described in more detail herein.

The computing environment 100 may include the network testing server farm 130. The network testing server farm 130 may include one or more network testing servers 140. The network testing server(s) 140 may be one or more blade servers configured within a blade enclosure and/or one or more servers of any other server type. The network testing server(s) 140 may execute one or more virtual machines 141, 142, 143 . . . 149. In various embodiments, the network testing server(s) 140 may execute any number of virtual machines.

The network testing server(s) 140 may be configured to communicate with a management network 190 as well as with the core network 120. The network testing server(s) 140 may be configured with one or more network interfaces for communicating with the core network 120 and one or more other, distinct network interfaces for communicating with the management network 190. In various embodiments, the management network 190 may support network device management traffic (e.g., as opposed to the user traffic supported by the core network 120).

In various embodiments, a user may operate one or more of the testing management device(s) 180 to exchange management traffic 192 with the network testing server(s) 140 via the management network 190. For example, a user may operate a testing management device 181 to request (e.g., via management traffic 192) access to a virtual machine configured at or otherwise executing on the network testing server(s) 140. In response (in some examples, after initiating a virtual machine 141, authorizing the user, assigning the user to a virtual machine 141, etc.), the network testing server(s) 140 may generate and present a testing user interface (e.g., via the management traffic 192) using the virtual machine 141 to the user operating the testing management device 181. The user may operate the testing management device 181 to provide testing input in the form of network performance test configurations and/or parameters (e.g., as described in more detail herein) via the testing user interface and management traffic 192 to the network testing server(s) 140

Based on the network performance test configurations and/or parameters received via the management traffic 192, the network testing server(s) 140 may configure and execute one or more testing applications, such as iPerf, using a virtual machine. For example, the virtual machine 141 executing on the network testing server(s) 140 may convert the received test configurations and/or parameters into a format and/or data compatible with the one or more testing applications and execute the application using the converted data on the virtual machine 141.

In executing a configured network performance test, the network testing server(s) 140 may exchange test traffic 191 with one or more of the test devices 170 via the core network 120. The network testing server(s) 140 may transmit and receive test traffic 191 via one or more network interfaces that are dedicated communicative connections to the core network 120. For example, the virtual machine 141 may generate test traffic 191 and transmit such traffic to the one or more test devices 170 via the core network 120.

The network testing server(s) 140, using the network testing application executing on the virtual machine 141, may measure and/or analyze the traffic exchanged as test traffic 191 and associated data to determine test results (e.g., as described in more detail herein). These test results may be presented in a testing user interface that is generated and provided to a user (e.g., of testing management device 181).

Example Components

Figure 2:
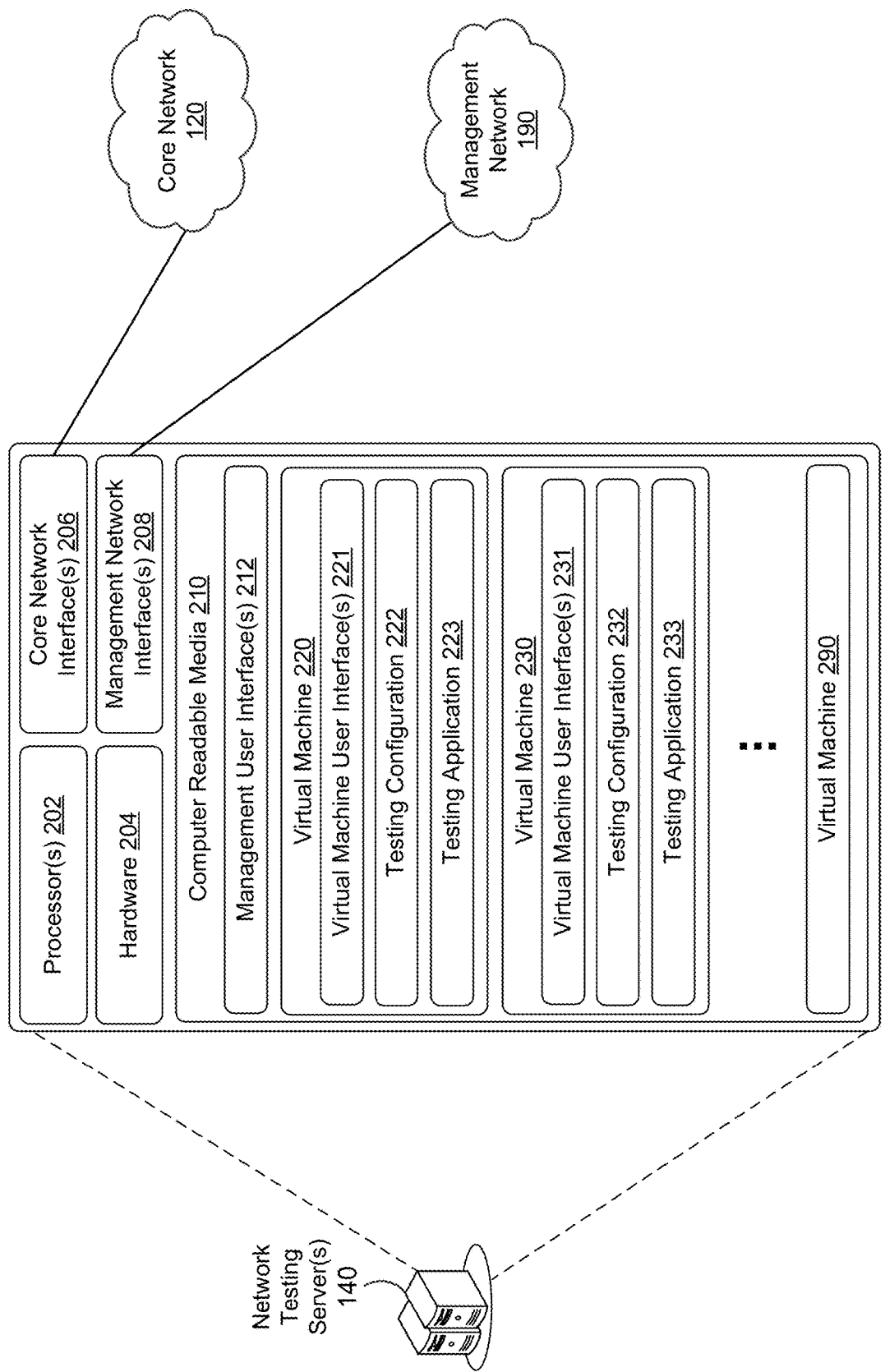
FIG. 2 is a schematic diagram of illustrative components in an example network testing server that may be configured for performing network performance testing, in accordance with examples of the disclosure.

FIG. 2 is a schematic diagram of illustrative components in the example network testing server(s) 140 that may be configured in a testing system as described herein. The network testing server(s) 140 may include processor(s) 202 and computer readable media 210. The computer readable media 210 may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic and/or optical cards, solid-state memory devices, and/or other types of storage media suitable for storing electronic instructions. The various modules and components configured in the computer readable media 210 may include one or more pieces of software, computer-readable data, computer-executable code, and/or any combination thereof that is configured to interoperate with one or more computer-executable applications.

The network testing server(s) 140 may also include a core network interface 206 that may be any one or more network communications interfaces configured to communicate with the core network 120 and that may be configured with any wireless and/or wired communication components. The network testing server(s) 140 may also, or instead, include a management network interface 208 that may be any one or more network communications interfaces configured to communicate with the management network 190 and that may be configured with any wireless and/or wired communication components. For example, each of the interfaces 206 and/or 208 may be one or more of a wired network interface transceiver, a cellular communication transceiver, a Wi-Fi transceiver, and so forth.

The network testing server(s) 140 may also, or instead, include hardware 204 that may be any one or more hardware components that may be configured at a server (e.g., a blade server, stand-alone server, etc.). For example, the hardware 204 may include a data output device (e.g., visual display, audio speakers), and one or more data input devices. The data input devices may include, but are not limited to, combinations of one or more of keypads, keyboards, mouse devices, touch screens, microphones, speech recognition packages, and any other suitable devices or other electronic/software selection methods. The hardware 204 may also, or instead, include an internal clock, a sound card, a video card, a camera, device interfaces, motion sensors, inertia sensors, proximity sensors, a compass, and/or other components that enable the network testing server(s) 140 to perform the functions described herein and any other suitable functions.

The computer readable media 210 may include a management user interface component 212 that may enable a user (e.g., administrator) to provide inputs and receive outputs from a management device. For example, the management user interface component 212 may be one or more software modules that, when executed by the processor(s) 202 and/or one or more other processors, generate and cause to be presented to a user on a display one or more graphical user interfaces configured with one or more display elements that allow such a user to view data associated with the network testing server(s) 140 and/or applications, processes, virtual machines, etc. associated therewith. Such graphical user interfaces may also, or instead, be configured with control elements that allow a user to configure, modify, delete, alter, and/or otherwise adject various parameters and configurations of the network testing server(s) 140.

For example, the management user interface component 212 may provide one or more administrative user interfaces that allows an administrator to manage the network testing server(s) 140 and/or display management data associated with the network testing server(s) 140. For example, the management user interface component 212 may generate and present an administrative user data interface that provides data associated with the users interacting with the network testing server(s) 140 (e.g., currently and/or historically), such as usernames, usage logs, error logs, and/or any other data associated with usage of the testing system. The management user interface component 212 may also, or instead, generate and present an administrative system data interface that provides data associated with the network testing server(s) 140's performance and status (e.g., currently and/or historically), such as network testing server(s) 140 component performance history (e.g., CPU utilization, memory utilization, network interface utilization, etc.), system error logs, failures, alarms, availability, etc.

The computer readable media 210 may further store one or more software modules that, when executed by the processor(s) 202 and/or one or more other processors, generate and execute a virtual machine. For example, the computer readable media 210 may store virtual machine components 220, 230 . . . 290 which may represent any number of virtual machines that may be executed by the network testing server(s) 140. When a user accesses or requests access to the network testing server(s) 140, the network testing server(s) 140 may, in response, assign or otherwise associate the user with a particular virtual machine. Each such virtual machine may have its own interface generated component and testing application components. Note that such components may include portions that are reused by other pieces of software and/or may be instances of particular pieces of software that are duplicated in memory as needed by the network testing server(s) 140.

For example, the virtual machine components 220 may include a virtual machine user interface component(s) 221. The virtual machine user interface component(s) 221 may generate a testing management interface that may allow a user to enter various test configurations and/or parameters. The virtual machine user interface component(s) 221 may also display test results and/or any other data to a user. The configurations and/or parameters received from a user by the virtual machine user interface component(s) 221 via a testing management interface may be stored in the computer readable media 210 as testing configuration 222.

The virtual machine 220 may use the testing configuration 222 to perform testing using the testing application 223. The testing application 223 may be one or more instances of a testing application such as iPerf. In various embodiments the testing application 223 may be one or more other testing applications. The virtual machine 220 may convert or otherwise alter configurations and/or parameters received via the virtual machine user interface 221 into a form compatible with the testing application 223. The virtual machine 220 may then execute one or more tests based on the testing configuration 222.

As shown in the figure, multiple instances of virtual machines may be configured and/or executed by the network testing server(s) 140. Each such virtual machine may have components such as those described in regard to the virtual machine 220. For example, the virtual machine components 230 may include a virtual machine user interface component(s) 231, a testing configuration 232, and/or a testing application 233. The testing application 233 may be a different testing application than the testing application 223. In various embodiments, each virtual machine may executer one or more testing applications that differ from the one or more testing applications that are executed by another virtual machine. The virtual machine components 290 may include similar components, and so forth.

Illustrative Interfaces and Testing Configurations and Parameters

Figure 3:
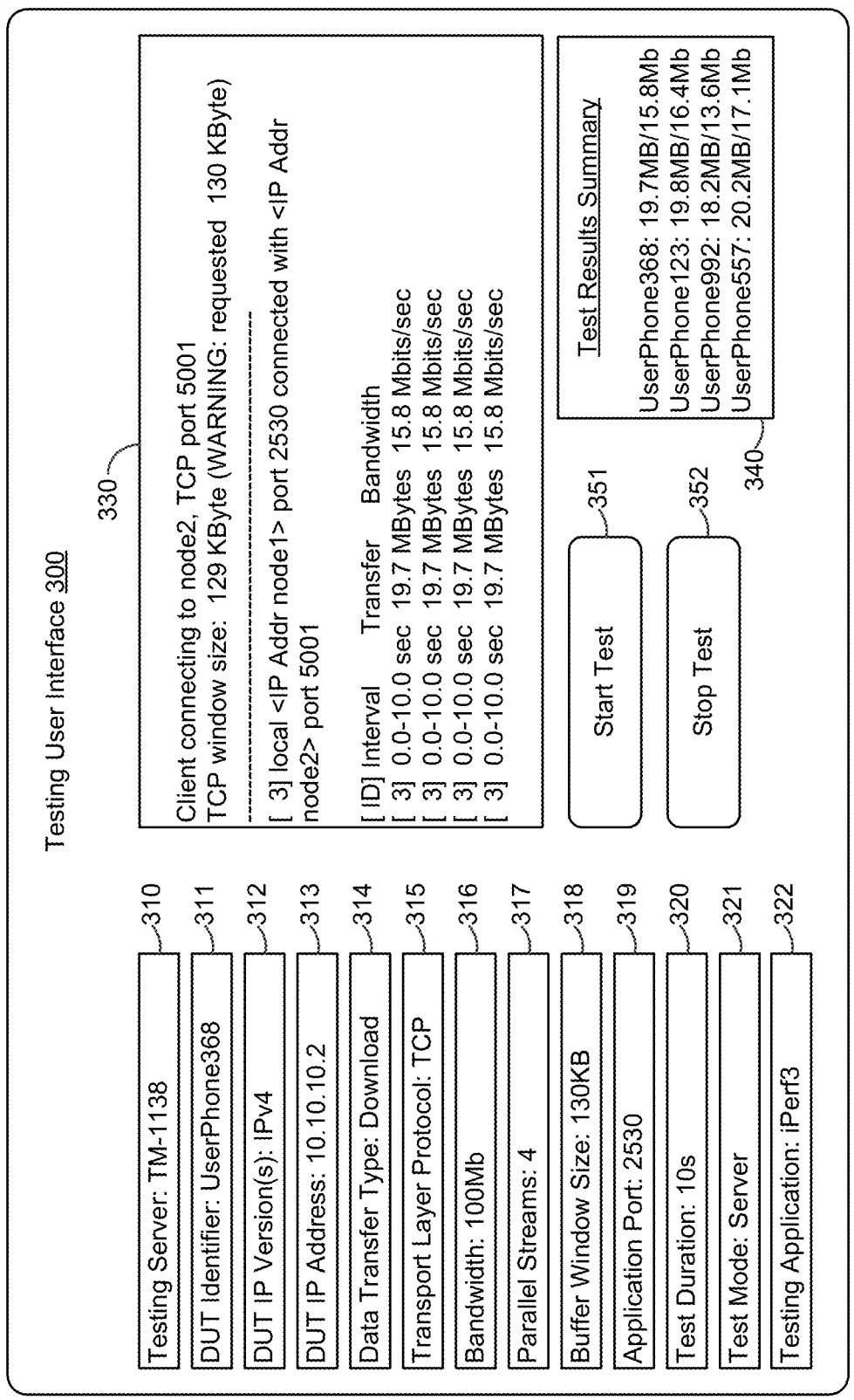
FIG. 3 is a graphical representation of an illustrative network testing user interface (UI) displaying aspects of a network performance testing configuration, in accordance with examples of the disclosure.

FIG. 3 shows a graphical representation of a testing user interface 300 that may be a graphical user interface generated and presented to a user in a testing system as described herein. In various embodiments, the testing user interface 300 may be generated by a virtual machine that may use the data input at the testing user interface 300 to generate and execute a network performance test as described herein.

In various embodiments, one or more parameters and/or configurations for one or more network performance tests may be selected or otherwise input at the testing user interface 300. Such inputs may be user-activatable control elements. Alternatively, or in addition, one or more parameters and/or configurations for one or more network performance tests may be displayed on the testing user interface 300. Such data may be displayed in one or more display elements.

For example, the testing user interface 300 may allow a user to specify a testing server 310 for originating or otherwise performing the test. For example, while in some embodiments a test may be performed by a server executing the virtual machine on the test configuration is received, in other embodiments, the test may be performed on another server that may be specified by the user, such as the server specified in testing server 310. Alternatively, or in addition, the testing server 310 may indicate the server on which the test will be performed, without providing an option to the user of selecting, specifying, or modifying the server on which the test will be performed. Note that in some embodiments, more than one server may be associated with or indicated in the testing server 310.

The testing user interface 300 may also, or instead, allow a user to select, specify, and/or input one or more user devices to be associated with the test at a DUT 311. The data input or otherwise received at the DUT 311 may be a device identifier, address, pointer, etc. Alternatively, or in addition, for example when the testing system determines the test devices, the DUT 311 may indicate one or more devices under test without allowing a user to select, specify, or modify such test devices. Note that in some embodiments, more than one test devices may be associated with or indicated in the DUT 311.

The testing user interface 300 may also, or instead, allow a user to select, specify, and/or input one or more network layer protocols for use in communicating test traffic with the DUT. For example, DUT IP version 312 may allow a user to specify the type of IP traffic to be used in the test (e.g., IPv4, IPv6, etc.). Alternatively, or in addition, for example when the testing system determines the test protocols, the DUT IP version 312 may indicate the one or more network protocols to be used in the test without allowing a user to select, specify, or modify such a protocol. Note that in some embodiments, more than one network protocol may be used in a test and associated with or indicated in the DUT IP version 312.

The testing user interface 300 may also, or instead, allow a user to select, specify, and/or input one or more network layer addresses for use in communicating with a DUT. For example, DUT IP address 313 may allow a user to specify the IP address of a particular DUT. Alternatively, or in addition, for example when the testing system determines the test devices, the DUT IP address 313 may indicate the one or more network addresses to be used in the test without allowing a user to select, specify, or modify such addresses. Note that in some embodiments, more than one network address may be used in a test (e.g., for one device) and associated with or indicated in the DUT IP address 313.

The testing user interface 300 may also, or instead, allow a user to select, specify, and/or input one or more data transfer types to be tested. For example, data transfer type 314 may allow a user to specify that the test is to test downloads and/or uploads (e.g., by a DUT). Alternatively, or in addition, for example when the testing system determines the one or more data transfer types to be tested, the data transfer type 314 may indicate the one or more data transfer types to be used in the test without allowing a user to select, specify, or modify such transfer types. Note that in some embodiments, more than data transfer type may be used in a test (e.g., for one device) and associated with or indicated in the data transfer type 314

The testing user interface 300 may also, or instead, allow a user to select, specify, and/or input one or more transport layer protocols for use in communicating with a DUT. For example, transport layer protocol 315 may allow a user to specify the transport layer protocol to be used in exchanging traffic with a particular DUT (e.g., UDP, TCP, etc.). Alternatively, or in addition, for example when the testing system determines the transport layer protocols to be used in a test, the transport layer protocol 315 may indicate the one or more transport layer protocols to be used in the test without allowing a user to select, specify, or modify such protocols. Note that in some embodiments, more than one transport layer protocol may be used in a test and associated with or indicated in the transport layer protocol 315.

The testing user interface 300 may also, or instead, allow a user to select, specify, and/or input one or more testing bandwidths. For example, bandwidth 316 may allow a user to specify the bandwidth to be used in exchanging traffic with a particular DUT (e.g., for upload, download, or both). Alternatively, or in addition, for example when the testing system determines the amount of bandwidth to be used in a test, the bandwidth 316 may indicate the one or more bandwidths (e.g., upload, download, or both) to be used in the test without allowing a user to select, specify, or modify such bandwidths. Note that in some embodiments, both upload bandwidth and download bandwidth may be specified and/or indicated at the bandwidth 316.

The testing user interface 300 may also, or instead, allow a user to select, specify, and/or input a number of data streams to be used in a test. For example, parallel streams 317 may allow a user to select or specify a number of streams to be used in transmitting traffic to and/or receiving traffic from a particular DUT. Alternatively, or in addition, for example when the testing system determines the number of streams to be used in a test, the parallel streams 317 may indicate the number of streams (e.g., for transmit, receive, or both) to be used in the test without allowing a user to select, specify, or modify the number of streams. Note that in some embodiments, numbers of both transmit and receive streams may be specified and/or indicated at the parallel streams 317.

The testing user interface 300 may also, or instead, allow a user to select, specify, and/or input a buffer window size to be used in a test. For example, buffer window size 318 may allow a user to select or otherwise input a buffer window size to be used in the test. Alternatively, or in addition, for example when the testing system determines the buffer window size to be used in a test, the buffer window size 318 may indicate the buffer window size to be used in the test without allowing a user to select, specify, or modify the buffer window size. Note that in some embodiments, more than one buffer window size may be specified and/or indicated at the buffer window size 318.

The testing user interface 300 may also, or instead, allow a user to select, specify, and/or input an application port to be used in a test. For example, application port 319 may allow a user to select or otherwise input one or more application ports to be used in the test. Alternatively, or in addition, for example when the testing system determines the application port(s) to be used in a test, the application port 319 may indicate one or more application ports to be used in the test without allowing a user to select, specify, or modify the application port. Note that in some embodiments, more than one application port may be specified and/or indicated at the application port 319.

The testing user interface 300 may also, or instead, allow a user to select, specify, and/or input a test duration. For example, test duration 320 may allow a user to select or otherwise input an amount of time for which the test is to be run or executed. Alternatively, or in addition, for example when the testing system determines the test duration, the test duration 320 may indicate a duration of the test without allowing a user to select, specify, or modify the test duration.

The testing user interface 300 may also, or instead, allow a user to select, specify, and/or input a test mode. For example, test mode 321 may allow a user to select or otherwise input a test mode for the test (e.g., server mode, client mode, single threaded mode, etc.). Available modes may vary based on the testing application used by the virtual machine to perform the testing. Alternatively, or in addition, for example when the testing system determines the test mode, the test mode 321 may indicate a mode of the test without allowing a user to select, specify, or modify the test mode.

The testing user interface 300 may also, or instead, allow a user to select, specify, and/or input one or more testing applications. For example, testing application 322 may allow a user to select or otherwise input one or more testing applications to be used to perform the test (e.g., iPerf, iPerf3, etc.). In various embodiments, multiple testing applications may be selected, for example, to perform a test with a same or similar configuration with different testing applications. Alternatively, or in addition, for example when the testing system determines the testing application, the testing application 322 may indicate the testing application to be executed without allowing a user to select, specify, or modify the testing application.

Note that any other testing application configurations and/or parameters may be indicated in the testing user interface 300 and/or may be selected or otherwise input in the testing user interface 300.

In various embodiments, as parameters and/or configurations are detected and/or displayed on the testing user interface 300, the virtual machine generating the testing user interface 300 may convert or otherwise generate corresponding data compatible with one or more testing applications. For example, the virtual machine may convert the data in elements 310-321 onto iPerf format before storing it. Alternatively, the virtual machine may store such data as received and/or displayed until execution of the testing application is initiated, at which time the virtual machine may then convert such data.

The testing user interface 300 may also include a control element configured to initiate a test using the configurations and/or parameters configured at the testing user interface 300. For example, the testing user interface 300 may include a test initiation control element 351. In response to user activation of the control element 351, the virtual machine generating the testing user interface 300 may execute a testing initiation command. For example, the virtual machine may execute an application-specific testing initiation command (e.g., a command line instructions) to initiate a test using the configurations and/or parameters as converted to iPerf or other testing application configuration data. In various embodiments, the testing system may convert the configurations and/or parameters received at the testing user interface 300 to iPerf configuration data and/or other testing application configuration data in response to detecting the activation of the control element 351.

The testing user interface 300 may also, or instead, include a control element configured to terminate a test in response to user activation of that control element. For example, the testing user interface 300 may include a test termination control element 352. In response to user activation of the control element 352, the virtual machine generating the testing user interface 300 may execute a testing termination command. In examples in which the testing system implements a testing application such as iPerf, the testing system may execute an iPerf testing termination command or other application-specific testing termination command (e.g., a command line instruction) to terminate the test using the configurations and/or parameters as converted to iPerf or other testing application configuration data.

The testing user interface 300 may also, or instead, include one or more testing results display elements. For example, the testing user interface 300 may include a test results display element 330 that displays the results of a test initiated using the configurations and/or parameters configured at the testing user interface 300. Such results may be displayed in display element 330 at the conclusion of the test (e.g., upon termination of the test by a user and/or completion of the test based on the test parameters and/or configurations (e.g. test duration)). Alternatively, or in addition, such results may be displayed in display element 330 as the test is ongoing. For example, the display element 330 may display incremental or interim results during the test for particular portions of the test for which results may be available.

The testing user interface 300 may also, or instead, include one or more testing results summary display elements. For example, the testing user interface 300 may include a test results summary display element 340 that displays the results of multiple tests. For example, multiple tests may be run on the same virtual machine and/or across multiple virtual machines, sequentially or in parallel, and/or using the same or different sets of configurations and/or parameters. The test results summary display element 340 may include or summarize the results of such tests. This summarization of the results of multiple tests may allow a user to easily compare the results of the various tests and test configurations Determine virtual machine for user interaction, to one another.

Illustrative Operations

Figure 4:
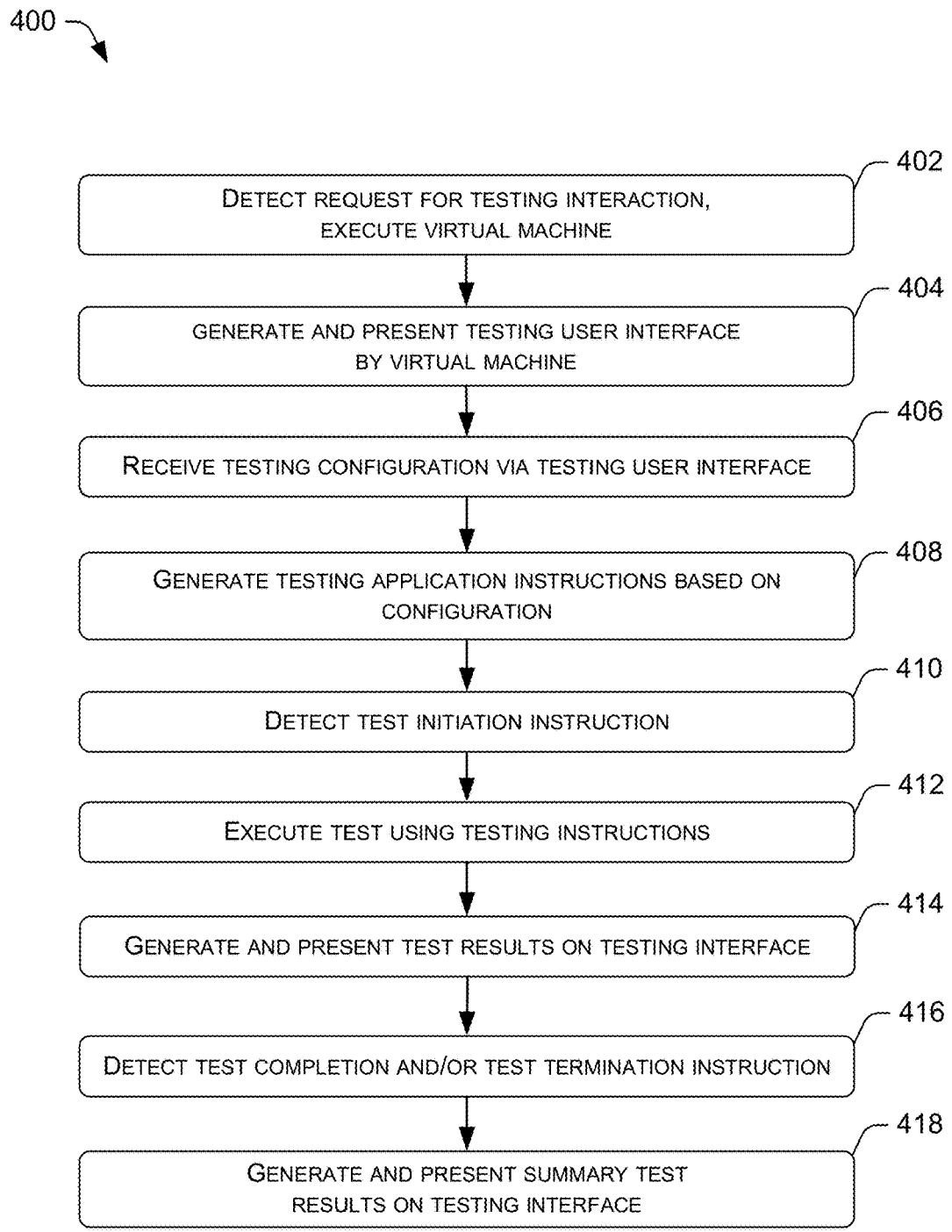
FIG. 4 is a flow diagram of an illustrative process for performing network performance testing, in accordance with examples of the disclosure.

FIG. 4 shows a flow diagram of an illustrative process 400 for performing network performance testing using a server farm according to the disclosed embodiments. The process 400 is illustrated as a collection of blocks in a logical flow diagram, which represents a sequence of operations that can be implemented in software and executed in hardware. In the context of software, the blocks represent computer-executable instructions that, when executed by one or more processors, perform the recited operations. Generally, computer-executable instructions include routines, programs, objects, components, data structures, and the like that perform functions and/or implement particular abstract data types. The order in which the operations are described is not intended to be construed as a limitation, and any number of the described blocks can be omitted and/or combined in any order and/or in parallel to implement the processes. For discussion purposes, the process 400 is described with reference to the computing environment 100 of FIG. 1, however other environments may also be used.

At block 402, a network testing server, such as the network testing server(s) 140, may detect a request for testing interaction, such as a request to initiate a network performance test or a log-in by an authorized user. Alternatively, or in addition, the network testing server may detect an activation of a testing application configured at a user computing device that interacts with testing management software configured on the network testing server (e.g., using an applicant programming interface (API)). Any other forms of detecting a request of any type for testing interaction are contemplated. This request may be received or otherwise detected via a management network interface configured at the network testing server.

Further at block 402, the network testing server may determine a virtual machine for interaction with the user requesting interaction. For example, the network testing server may execute a new virtual machine for each detected user. Alternatively, the network testing server may associate the user associated with the detected request with a currently executing virtual machine. The network testing server may then facilitate a communication session between a device associated with the user and the virtual machine, for example, using a management network interface configured at the network testing server.

At block 404, the virtual machine may generate and present a testing user interface to the user. For example, the virtual machine may generate the interface by transmitting instructions and data to a user device operated by the requesting user that causes the user device to generate and present the interface on a display. The interface may display and/or solicit any of a variety of types of testing configurations and/or parameters, including any of those described herein (see, e.g., the testing user interface 300 of FIG. 3 and associated description).

At block 406, the virtual machine may receive configurations and/or parameters for the requested network performance test. Such configurations and/or parameters may be detected as provided by the user and/or preconfigured based on various other data (e.g., selection of preconfigured test by the user, default parameters and/or configurations, etc.). IN various embodiments, such configurations and/or parameters may be detected when submitted with a request to initiate the test, such as at block 410, which may be performed in parallel with block 406.

At block 408, the virtual machine may generate testing application instructions based on the parameters and/or configurations received at block 406. Where a selection or indication of one or more testing applications is included in the parameters and/or configurations received at block 406, the virtual machine may also determine the one or more testing applications for which instructions are to be generated at block 408. In various embodiments, multiple testing applications may be indicated. In such embodiments, the virtual machine may generate a set of instructions for each such testing application.

In various embodiments, the parameters and/or configurations received via a testing user interface may be data that the virtual machine may be configured to convert to input data that is compatible with one or more testing applications. For example, a testing system may use iPerf as a testing application. A virtual machine may receive parameters and/ or configurations for a test from a user and convert those parameters and/or configurations into iPerf-compatible command line instructions. The virtual machine may also generate data for one or more other testing applications, thereby allowing the use of a variety of testing application with a common user interface.

At block 410, the virtual machine may detect a request to initiate the test. For example, the virtual machine may detect activation of a test initiation control element (e.g., element 351 of FIG. 3) on the testing user interface.

In response to detecting the request to initiate the test, the virtual machine may, at block 412, execute the test. This may include executing the instructions generated at block 408. Note that in some embodiments, such instructions may be generated in response to detecting the request to initiate the test at block 410, while in other embodiments, the instructions may have been generated as the parameters and/or configurations were detected at block 406.

At block 414, test results may be displayed, for example on a display element as described in regard to testing user interface 300 of FIG. 3 (e.g., test results display element 330 of FIG. 3). In various embodiments, portions of test results may be displayed as they are determined while the test is ongoing, while in other embodiments the test results may be displayed upon completion of the test.

At block 416, test completion and/or termination may be detected. For example, a particular test may be configured to run for a specified period of time (duration). The virtual machine may determine when the test has been run for that period of time and may, in response, terminate the test. Alternatively, or in addition, the virtual machine may detect the activation of a test termination control element (e.g., element 352 of FIG. 3) and may, in response, terminate the test.

At block 418, the virtual machine may generate and present summary testing results. For example, the virtual machine may present the final results of the test most recently performed. The virtual machine may also, or instead, present the results of one or more other tests performed, for example, along with the results of the test most recently performed, for ease of comparison by a user. Such summary testing results may be presented in a testing user interface (e.g., test results summary display element 340 of FIG. 3).

In summary, by providing a common user interface for the collection of testing configurations and parameters and virtual machines for the execution of network performance tests, the disclosed systems and techniques may be able to increase the efficiency of usage of testing resources and reduce the time and effort required to implement network performance tests of various types.

EXAMPLE CLAUSES

A: A method performed by a network performance testing server, the method comprising: executing a virtual machine on the network testing server; receiving, at the virtual machine, a plurality of testing parameters from a user computing device via a management network communications interface configured at the network testing server; generating, by the virtual machine, a set of network testing instructions based at least in part on the plurality of testing parameters; executing, by the virtual machine, a network testing application using the set of network testing instructions, wherein executing the network testing application comprises: generating, by the network testing application, test traffic based at least in part on the set of network testing instructions; and transmitting the test traffic to a wireless mobile device via a core network communications interface configured at the network testing server; determining, by the virtual machine, test results based at least in part on executing the network testing application; and transmitting, by the virtual machine, the test results to the user computing device via the management network communications interface.

B: The method of paragraph A, wherein: the plurality of testing parameters comprises an indication of the network testing application; and executing the network testing application is based at least in part on the indication of the network testing application.

C: The method of paragraph A or B, wherein the network testing application is iPerf.

D: The method of any of paragraphs A-C, wherein generating the set of network testing instructions comprises generating one or more command line instructions.

E: The method of any of paragraphs A-D, wherein executing the virtual machine comprises: receiving, at the network testing server, a connection request from the user computing device via the management network communications interface; and at least partially in response to receiving the connection request, executing the virtual machine.

F: The method of any of paragraphs A-E, further comprising: generating, by the virtual machine, a graphical user interface comprising a plurality of elements associated with the plurality of testing parameters; and transmitting, by the virtual machine to the user computing device via the management network communications interface, an instruction to present the graphical user interface on a display configured at the user computing device.

G: The method of any of paragraphs A-F, wherein the plurality of testing parameters comprises a parameter associated with one or more of: an identifier of a device under test; a network address of a device under test; a network layer protocol; a transport layer protocol; or a port number.

H: A network testing system comprising: one or more processors; a management network communications interface; a core network communications interface; and non-transitory computer-readable media storing computer-executable instructions that, when executed by the one or more processors, cause the one or more processors to perform operations comprising: executing a virtual machine at least partially in response to a request for access to the network testing system received via the management network communications interface; generating, by the virtual machine, a set of network testing instructions based at least in part on one or more testing parameters received from a user computing device via the management network communications interface; executing, by the virtual machine, a network testing application using the set of network testing instructions, wherein executing the network testing application comprises: generating test traffic based at least in part on the set of network testing instructions; and transmitting the test traffic to a wireless mobile device via the core network communications interface; determining, by the virtual machine, test results based at least in part on executing the network testing application; and transmitting, by the virtual machine, the test results to the user computing device via the management network communications interface.

I: The network testing system of paragraph H, wherein: the network testing system comprises a plurality of blade servers; and the one or more processors, the management network communications interface, the core network communications interface, and the non-transitory computer-readable media are configured on a first blade server of the plurality of blade servers.

J: The network testing system of paragraph H or I, wherein determining the test results comprises determining a subset of the test results during execution of the network testing application.

K: The network testing system of any of paragraphs H-I, wherein determining the test results comprises: detecting termination of the network testing application; and at least partially in response to detecting the termination of the network testing application, determining the test results.

L: The network testing system of paragraph K, wherein detecting termination of the network testing application comprises: detecting a user selection of a test termination control element; and at least partially in response to detecting the user selection of the test termination control element, terminating, by the virtual machine, the network testing application.

M: The network testing system of any of paragraphs H-L, wherein: the one or more testing parameters comprises a test duration parameter associated with a period of time; and the operations further comprise terminating, by the virtual machine, the network testing application following the period of time after executing the network testing application.

N: The network testing system of any of paragraphs H-M, wherein transmitting the test results to the user computing device comprises: generating, by the virtual machine, a graphical user interface comprising a display element configured to display a subset of the test results; and transmitting, by the virtual machine to the user computing device via the management network communications interface, an instruction to present the graphical user interface on a display configured at the user computing device.

O: A network testing server comprising: one or more processors; a first network interface configured to communicate with a core network; a second network interface configured to communicate with a management network; and non-transitory computer-readable media storing computer-executable instructions that, when executed by the one or more processors, cause the one or more processors to perform operations comprising: executing a virtual machine on the network testing server; generating, by the virtual machine, a graphical user interface comprising a plurality of control elements associated with a plurality of testing parameters; transmitting, by the virtual machine to a user computing device via the second network interface, an instruction to present the graphical user interface on a display configured at the user computing device; receiving, by the virtual machine from the user computing device, one or more of the plurality of testing parameters; generating, by the virtual machine, a set of network testing instructions based at least in part on the one or more of the plurality of testing parameters; executing, by the virtual machine, a network testing application using the set of network testing instructions, wherein executing the network testing application comprises transmitting test traffic to a wireless mobile device via the first network interface; determining, by the virtual machine, test results based at least in part on executing the network testing application; and transmitting, by the virtual machine, the test results to the user computing device via the second network interface.

P: The network testing server of paragraph O, wherein the one or more of the plurality of testing parameters comprises an indication of the wireless mobile device.

Q: The network testing server of paragraph O or P, wherein executing the virtual machine comprises: receiving a request to execute the network testing application at the network testing server; and at least partially in response to receiving the request to execute the network testing application, executing the virtual machine.

R: The network testing server of any of paragraphs O-Q, wherein generating the graphical user interface comprises generating the graphical user interface at least partially in response to receiving the request to execute the network testing application.

S: The network testing server of any of paragraphs O-R, wherein: the network testing application is iPerf; and the set of network testing instructions comprises one or more iPerf command line instructions.

T: The network testing server of any of paragraphs O-S, wherein: the graphical user interface further comprises a test initiation control element; and executing the network testing application comprises executing the network testing application at least partially in response to detecting a user selection of the test initiation control element.

While the example clauses described above are described with respect to one particular implementation, it should be understood that, in the context of this document, the content of the example clauses can also be implemented via a method, device, system, computer-readable medium, and/or another implementation. Additionally, any of the examples A-T can be implemented alone or in combination with any other one or more of the examples A T.

CONCLUSION

Depending on the embodiment, certain operations, acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, components, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks, modules, and components described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements, and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Unless otherwise explicitly stated, articles such as "a" or "the" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method performed by a network testing server, the method comprising:
executing a virtual machine on the network testing server;
receiving, at the virtual machine, a plurality of testing parameters from a user computing device via a management network communications interface configured at the network testing server;
generating, by the virtual machine, a set of network testing instructions based at least in part on the plurality of testing parameters;
executing, by the virtual machine, a network testing application using the set of network testing instructions, wherein executing the network testing application comprises:
generating, by the network testing application, test traffic based at least in part on the set of network testing instructions; and
transmitting the test traffic to a wireless mobile device via a core network communications interface configured at the network testing server;
determining, by the virtual machine, test results based at least in part on executing the network testing application; and
transmitting, by the virtual machine, the test results to the user computing device via the management network communications interface,
wherein the plurality of testing parameters comprises a parameter associated with one or more of:
an identifier of a device under test;
a network address of a device under test;
a network layer protocol;
a transport layer protocol; or
a port number.

2. The method of claim 1, wherein:
the plurality of testing parameters comprises an indication of the network testing application; and
executing the network testing application is based at least in part on the indication of the network testing application.

3. The method of claim 1, wherein the network testing application is iPerf.

4. The method of claim 1, wherein generating the set of network testing instructions comprises generating one or more command line instructions.

5. The method of claim 1, wherein executing the virtual machine comprises:
receiving, at the network testing server, a connection request from the user computing device via the management network communications interface; and
at least partially in response to receiving the connection request, executing the virtual machine.

6. The method of claim 1, further comprising:
generating, by the virtual machine, a graphical user interface comprising a plurality of elements associated with the plurality of testing parameters; and
transmitting, by the virtual machine to the user computing device via the management network communications interface, an instruction to present the graphical user interface on a display configured at the user computing device.

7. A network testing system comprising:
one or more processors;
a management network communications interface;
a core network communications interface; and
non-transitory computer-readable media storing computer-executable instructions that, when executed by the one or more processors, cause the one or more processors to perform operations comprising:
executing a virtual machine at least partially in response to a request for access to the network testing system received via the management network communications interface;
generating, by the virtual machine, a set of network testing instructions based at least in part on one or more testing parameters received from a user computing device via the management network communications interface, wherein the one or more testing parameters comprises a test duration parameter associated with a period of time;
executing, by the virtual machine, a network testing application using the set of network testing instructions, wherein executing the network testing application comprises:
generating test traffic based at least in part on the set of network testing instructions; and
transmitting the test traffic to a wireless mobile device via the core network communications interface;
determining, by the virtual machine, test results based at least in part on executing the network testing application;
transmitting, by the virtual machine, the test results to the user computing device via the management network communications interface, and
terminating, by the virtual machine, the network testing application following the period of time after executing the network testing application.

8. The network testing system of claim 7, wherein:
the network testing system comprises a plurality of blade servers; and
the one or more processors, the management network communications interface, the core network communications interface, and the non-transitory computer-readable media are configured on a first blade server of the plurality of blade servers.

9. The network testing system of claim 7, wherein determining the test results comprises determining a subset of the test results during execution of the network testing application.

10. The network testing system of claim 7, wherein transmitting the test results to the user computing device comprises:
generating, by the virtual machine, a graphical user interface comprising a display element configured to disapply a subset of the test results; and
transmitting, by the virtual machine to the user computing device via the management network communications interface, an instruction to present the graphical user interface on a display configured at the user computing device.

11. A network testing server comprising:
one or more processors;
a first network interface configured to communicate with a core network;
a second network interface configured to communicate with a management network; and non-transitory computer-readable media storing computer-executable instructions that, when executed by the one or more processors, cause the one or more processors to perform operations comprising:
  executing a virtual machine on the network testing server;
  generating, by the virtual machine, a graphical user interface comprising a plurality of control elements associated with a plurality of testing parameters;
  transmitting, by the virtual machine to a user computing device via the second network interface, an instruction to present the graphical user interface on a display configured at the user computing device;
  receiving, by the virtual machine from the user computing device, one or more of the plurality of testing parameters;
  generating, by the virtual machine, a set of network testing instructions based at least in part on the one or more of the plurality of testing parameters;
  executing, by the virtual machine, a network testing application using the set of network testing instructions, wherein executing the network testing application comprises transmitting test traffic to a wireless mobile device via the first network interface;
  detecting termination of the network testing application, the detecting including detecting a user selection of a test termination control element;
  determining, by the virtual machine, test results based at least in part on executing the network testing application and based at least in part in response to detecting the termination of the network testing application;
  transmitting, by the virtual machine, the test results to the user computing device via the second network interface; and
  at least partially in response to detecting the user selection of the test termination control element, terminating, by the virtual machine, the network testing application.

12. The network testing server of claim 11, wherein the one or more of the plurality of testing parameters comprises an indication of the wireless mobile device.

13. The network testing server of claim 11, wherein executing the virtual machine comprises:
  receiving a request to execute the network testing application at the network testing server; and
  at least partially in response to receiving the request to execute the network testing application, executing the virtual machine.

14. The network testing server of claim 13, wherein generating the graphical user interface comprises generating the graphical user interface at least partially in response to receiving the request to execute the network testing application.

15. The network testing server of claim 11, wherein:
  the network testing application is iPerf; and
  the set of network testing instructions comprises one or more iPerf command line instructions.

16. The network testing server of claim 11, wherein:
  the graphical user interface further comprises a test initiation control element; and
  executing the network testing application comprises executing the network testing application at least partially in response to detecting a user selection of the test initiation control element.

* * * * *